United States Patent [19]

Nagano

[11] Patent Number: 4,654,724
[45] Date of Patent: Mar. 31, 1987

[54] RECORDING METHOD FOR VIDEO AND AUDIO SIGNALS IN MAGNETIC PICTURE RECORDING SYSTEM

[75] Inventor: Masahiko Nagano, Kanagawa, Japan

[73] Assignee: Fuji Photo Film Co., Ltd., Minami-ashigara, Japan

[21] Appl. No.: 851,317

[22] Filed: Apr. 9, 1986

Related U.S. Application Data

[63] Continuation of Ser. No. 533,738, Sep. 19, 1983, abandoned.

[30] Foreign Application Priority Data

Sep. 24, 1982 [JP] Japan .................................. 57-165073
Sep. 24, 1982 [JP] Japan .................................. 57-165074
Sep. 24, 1982 [JP] Japan .................................. 57-165075
Jul. 26, 1983 [JP] Japan .................................. 58-135205

[51] Int. Cl.$^4$ .......................................... H04N 9/491
[52] U.S. Cl. ........................... 358/310; 358/328; 358/341; 358/343; 360/19.1
[58] Field of Search .............. 360/18, 19.1, 22; 358/341, 343, 310, 328, 340, 342

[56] References Cited

U.S. PATENT DOCUMENTS

| | | | |
|---|---|---|---|
| 3,969,756 | 7/1976 | Palmer | 358/342 X |
| 4,416,002 | 11/1983 | Oguino et al. | 358/342 X |
| 4,476,501 | 10/1984 | Hirota et al. | 358/343 X |
| 4,486,793 | 12/1984 | Todd | 360/22 X |

Primary Examiner—Robert L. Richardson

[57] ABSTRACT

A recording method for magnetic recording and further high-density recording of video and audio signals by multiplexing them by frequency division, which is made free of crosstalk among audio signals by varying frequencies of carriers between adjacent tracks which are to be modulated with audio signals. Furthermore in the case of field skip recording, the audio signals of the fields to be skipped are recorded separately, then read out during the next recording field, multiplexed in frequency division together with the audio signals of the recorded field and recorded in a magnetic disk to record continuous audio signals.

7 Claims, 38 Drawing Figures

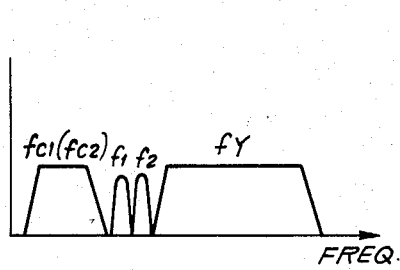
FIG. 2 (a)
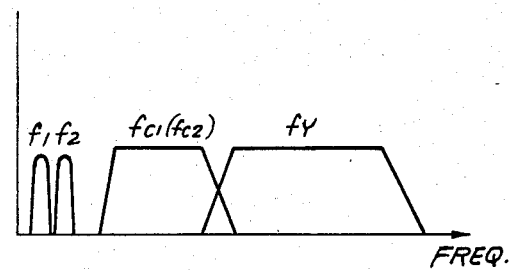
FIG. 2 (b)
FIG. 3 (a)
FIG. 3 (b)
FIG. 3 (c)
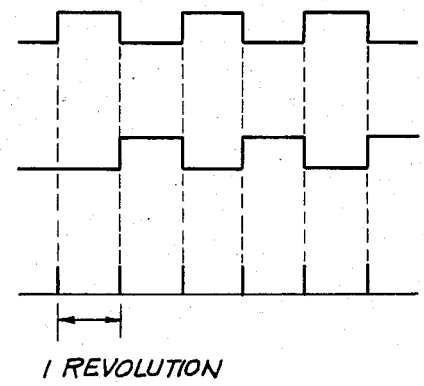
1 REVOLUTION
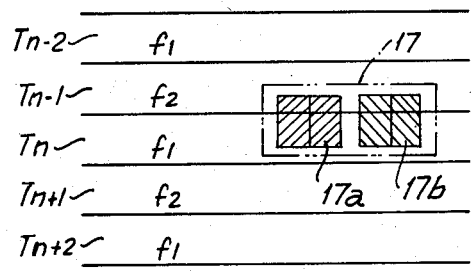
FIG. 4

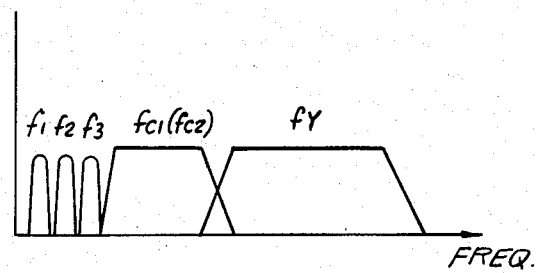
FIG. 13
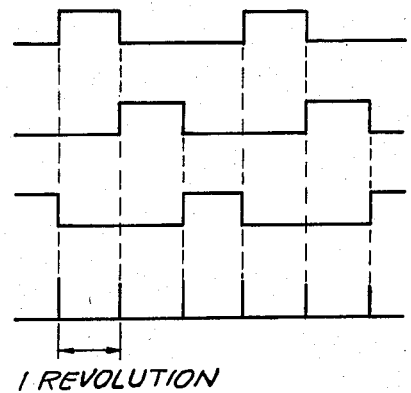
FIG. 14(a)
FIG. 14(b)
FIG. 14(c)
FIG. 14(d)
1 REVOLUTION
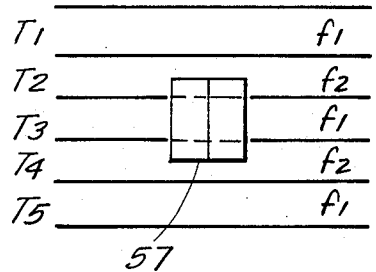
FIG. 16
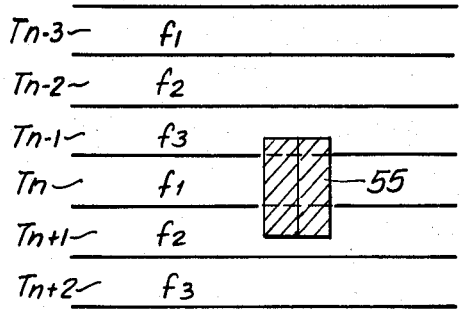
FIG. 15
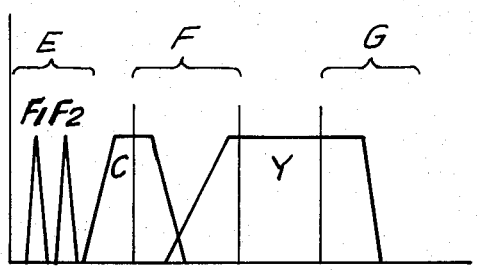
FIG. 17

RECORDING METHOD FOR VIDEO AND AUDIO SIGNALS IN MAGNETIC PICTURE RECORDING SYSTEM

This application is a continuation of application Ser. No. 533,738, filed Sept. 19, 1983, now abandoned.

BACKGROUND OF THE INVENTION (1) Field of the Invention

This invention relates to a recording method in magnetic picture recording systems which records video and audio signals in frequency-division multiplexing. This invention, more particularly, relates to:

(a) a recording method which can offer high quality pictures free of color phase irregularities and which is less susceptible to crosstalk in audio signals and to the influence of audio signals on pictures, even when color video and audio signals are recorded in high-density and in multiplex without guard bands;

(b) a method to conduct track servo-control by means of audio signals;

(c) a recording method for field skip recording wherein the audio signals of the skipped field are recorded in a form to improve the efficiency of the recording regions of a magnetic disk and the recorded signals are used to reproduce continuous audio voice.

(2) Description of the Prior Art

Two systems to improve recording density for recording video signals on a magnetic tape or a magnetic disk are known as a phase modulation system (PM) and a frequency modulation system (FM) by tilted azimuth.

In the FM method using tilted azimuth, as is well known in the art, luminance signals which have been frequency modulated or FM luminance signals are recorded at different azimuth between adjacent tracks. Even if a video head overrides the adjacent tracks at the time of reproducing, signals from the tracks of different azimuth will not mix except for the low frequency components. Therefore, even though the signals are recorded in a high density without guard bands or partially overwritten and a magnetic head is placed overriding the adjacent tracks for reproducing, crosstalk will not occur. Such azimuth effect can not be expected in the case of color video signals because a low frequency band is assigned to color signals for recording. It is, therefore, general practice either to record by rotating the phase of the so-called low band conversion color signals which are obtained by lowbands converting the carrier color signals by 90° per one horizontal scanning and at the same time inverting the phase per one track (PS system) or to record by inverting the phase of color signals for one horizontal scanning in one track but by recording with a fixed phase on the track adjacent thereto (PI system). Crosstalk can be reduced by interleaving the frequencies between adjacent tracks.

As disclosed in Japanese Patent Publication No. 56-51406 and Patent Application Laid-open Print No. 53-41126, the PM recording system is characterized as follows:

(1) the carrier to be modulated by luminance signals is synchronized with the relative movement between a video head and a magnetic medium;

(2) the modulation index mp is controlled to be 1.3 radian or less when the carrier is PM modulated by the luminance signals;

(3) these modulated luminance signals or carrier luminance signals are recorded in such a way that the positions of vertical and horizontal synchronizing signals in the adjacent tracks become aligned with each other and the carrier phases in adjacent tracks become also aligned.

According to this system, (i) the amplitudes of carrier components recorded on respective tracks are substantially constant because $mp \leq 1.3$ and the carrier components in the reproduced signals become constant even though the magnetic head overrides the adjacent tracks because the components are of the same phase as the tracks, (ii) because $mp \leq 1.3$, components of more than a secondary side band may be disregarded and because synchronous signals are aligned between tracks, the side band components of the reproduced signals merely become the composite of plural frames with a high correlation even if the video head overrides the adjacent tracks, (iii) therefore, luminance signals can be demodulated free of crosstalk even if they are recorded without guard bands or overwritten partially or even if tracking errors occur in reproduction.

In the case of color video signals, as color signals are recorded, too, an auxiliary carrier is phase-modulated with the color signals under the same conditions as the luminance signals, or the auxiliary carrier is suppressed-carrier modulated with the color signals so that the phases of carriers become aligned between the tracks in recording. This overcomes crosstalk. Alternatively, the phase of the color signals is rotated by 90° per one horizontal scanning and inverted per one track in recording (PS system) or the phase of the color signals is inverted for a track for one horizontal scanning but fixed for the track adjacent to the above (PI system) just like in the tilted azimuth recording method. This cancels crosstalk.

The system of high density magnetic picture recording has been improved as mentioned above, but the audio signals which should accompany the video signals have been left undeveloped except for the tilted azimuth recording method not beyond the level that audio signals are recorded in separate tracks. This imposes a limitation on the general efficiency of a magnetic medium as well as requires an additional head for audio signals. In order to solve such problems, audio signals may be recorded together with video signals in frequency multiplex. Although such a method causes no problem in case video signals are recorded with guard bands, as there is no correlation between audio signals of adjacent tracks in the case of recording without guard bands, crosstalk among audio signals becomes unavoidable by such simple multiplex recording and hence can not be put into practice.

On the other hand, there has long been desired an improvement for sound quality in a magnetic recording system. Bias recording system using a fixed head similar to the audio tape recorder has conventionally been used for recording/reproducing audio signals in VTR of the tilted azimuth FM system, recording frequency characteristics and wow-flutter which are dependent on the running speed of the magnetic medium such as a tape are increasingly deteriorated as color picture images are more and more recorded in a higher density for a longer time.

Many efforts have been made to improve heads and voice circuits (such as a noise-reduction circuit) in order to better the sound quality. In recent years, a FM modulation recording method for audio signals using a high-speed rotating head which is unique to VTR was developed in the field of household VTRs, and a Hi-Fi video system was made public in the magazine *The TV Gijutsu*, July 1983, aiming at sound quality as high as that in PCM (pulse code modulation) recording.

The proposed systems of this type can be classified roughly into two:

In (a) one of type, FM audio signals of two channels for stereo recording are formed with a suitable deviation in a manner to position at substantially the lower side of the FM luminance signal band zone in frequency allocations of VHS video recording signals, i.e. low band conversion color signals and FM luminance signals respectively, and the FM audio signals are recorded with a special rotating head for audio signals on a tape, and then the FM luminance signals and low band conversion color signals are recorded with a video rotating head in a conventional manner.

Audio and video signals are sequentially recorded twice in multiplex but they are taken out separately for reproduction. More specifically, by using a special compound of four heads comprising two video heads and two audio heads which are provided 120° ahead of the video heads, FM audio signals are first recorded with the audio heads positioned ahead on a tape and then the video signals are recorded with the video heads. The audio signals which have been recorded before are therefore erased on one surface and are recorded in a deep layer.

The audio signals reproduced from such recording tape interfere less with video signals, although they are somewhat lower in level. This method (referred to as VHS system hereinafter) can therefore be regarded as one which effectively utilizes the merits of FM modulation.

(b) Another type is the system wherein a space is made between the frequency band occupied by the color signals which are low-band converted and the frequency band occupied by the luminance signals which are FM modulated and FM audio signals are inserted into the interval space for recording. More particularly, FM audio signals are multiplexed with the video recording signals which have conventionally been used for VTR to be recorded with a conventional rotating video head of the two-head type. The system is advantageous in that voice can be recorded at high fidelity without the necessity of modifying the conventional recording system used for VTR. (This system is referred to as a Beta system hereinafter).

It is critical to remove crosstalk between audio signals in reproduction and the interference from the audio signals to the video signals in both systems. In the VHS system, azimuth recording is adopted by setting an azimuth angle in respective rotating audio heads in order to remove crosstalk between the audio signals of adjacent tracks.

In the Beta system, on the other hand, one pair or left and right carrier frequencies of FM modulation are switched to each of the recording tracks which are adjacent to A and B tracks for recording. In other words, carriers of four different frequencies, i.e. left and right signals of audio signals and tracks, A and B, are used for recording to obviate the problems. In the Beta system which does not adopt the deep layer recording system like the VHS system, the level of audio FM carriers is made lower than that of the FM luminance signals and the audio carrier frequencies are made to interleave with those of video signals in the determination of FM carrier frequencies in order to prevent mutual interference between video signals and audio signals.

As described above, due to the development achieved in multiplex recording technology of audio and video signals, the video recording at higher sound quality for a longer time recently became possible in the FM system by means of the titled azimuth technique.

In the VHS system, as audio signals are first recorded by a separate special audio head with azimuth and then video signals are recorded by a conventional video head, the interference between the video and the audio signals or the crosstalk among audio signals are almost completely avoided. But a question may be raised whether the audio head which is additionally provided is really worthy or not when the system is judged as a whole. The Beta system is not entirely free from problems such that the FM luminance band width has to be narrowed compared to the conventional Beta system in order to secure the FM audio frequency bands which can separately reproduce at sufficient S/N ratio and that complicated measures should be taken for the level variation of the color video signals caused by the approach of the audio signal band to the auxiliary carrier band of the low conversion color signals, even though the system is convenient in that a conventional video signal head can double as the audio head.

In the case of magnetic recording by field skip, there arises a problem of how to deal with the voice of the skipped fields.

As is well known in the art, the field skip recording method is effective in the case where almost similar video picture images continue. In this method, such similar video picture images are culled in recording to the extent not to affect the picture quality, and at the time of reproducing the recorded track is repeatedly reproduced for the number equal to the skipped fields. Although the movements in pictures become unnatural by this method, the method can remarkably improve the recording density in a broader sense as it can save recording time even if the recording medium and the density are the same. Another advantage of this method is that it can alleviate the restriction in the control mechanism that a recording head should be fed in an extremely short time when transferring from the end of one track to the beginning of the next track. This restriction is especially acute in concentric disk recording. For instance, when one field of video signals of NTSC system is recorded in one rotation of a disk without field skip, it is necessary to control the feed of the head so that it is fed once every 1/60second but it should be completed in its vertical retrace period in about 200 $\mu$ seconds. But when field skip is conducted for every one field, the head may be slowly fed once every 1/60 second, which corresponds to one field, thereby simplifying the head control mechanism remarkably. However, recorded data becomes inevitably sporadic timewise.

SUMMARY OF THE INVENTION

One object of this invention is to provide a novel magnetic recording method which does not generate crosstalk between audio signals of adjacent tracks even if the audio and video signals are recorded in multiplex for recording picture images without guard bands.

Another object of this invention is to provide a novel magnetic recording method which can secure a wider occupied band for each color video signal so as to improve picture quality, which is free from the influence of AM noise and which can multiplex-record such color video signals together with audio signals of high sound quality which can be used as tracking signals.

Still another object of this invention is to provide a magnetic recording method which can record/reproduce voice as continuous signals in field skip recording by means of simple circuits in the recording without guard bands as mentioned above.

The first invention to provide a magnetic recording method which can achieve such objects is of the type that FM luminance signals are obtained by FM-modulating a main carrier with luminance signals, first and second auxiliary carriers which are synchronized with the relative movement between a video head and a magnetic medium and are perpendicular to each other are PM modulated by one of the two color signals respectively; the two PM color signals are phase-shifted relatively by 180° per one horizontal scanning period so that they are in the relation of frequency interleave to each other for multiplexing the two PM color signals by the time of recording; and said FM luminance signals and the two PM color signals are recorded in multiplex on a magnetic medium in a manner that the azimuth of a track becomes different from that of adjacent tracks; at least the recording positions of horizontal synchronization signals are aligned between adjacent tracks, and the phases of the respective first and second auxiliary carriers are aligned between adjacent trakcs. This method is characterized in that audio signal carriers of each track are allocated with frequencies which are different from those of adjacent tracks, and the allocated carriers for each audio signal are modulated with audio signals so that they are recorded in multiplex together with said FM luminance signals and the two PM color signals which are phase-shifted by 180° relative to each other.

The second magnetic recording method is of the type that FM luminance signals are obtained by FM-modulating a main carrier with luminance signals, first and second auxiliary carriers which are synchronized with the relative movement between a video head and a magnetic medium and are perpendicular to each other are PM modulated by one of the two color signals respectively; the two PM color signals are phase-shifted relatively by 180° per one horizontal scanning period so that they are in the relation of frequency interleave to each other for multiplexing the two PM color signals by the time of recording, and said FM luminance signals and the two PM color signals are recorded in multiplex on a magnetic medium in a manner that the azimuth of a track becomes different from that of adjacent tracks; at least recording positions of horizontal synchronization signals are aligned between adjacent tracks; and the phases of respective first and second auxiliary carriers are aligned between adjacent tracks. This method is characterized in that the audio signal carriers of each track are allocated with different frequencies from those of adjacent tracks; the frequency for audio signal carriers is set at a band between the PM color signal band and the FM luminance signal band; the allocated carriers for each audio signal are modulated with audio signals to be recorded in multiplex together with said FM luminance signals and the two color signals which are phase-shifted by 180° relative to each other; and the carrier audio signals are used for tracking when reproduction is made.

The third magnetic recording method is of the type which can prevent crosstalk even if the video head overrides the adjacent tracks for reproduction by phase-shifting main carriers with luminance signals, aligning recording positions for synchronization signals in adjacent tracks, and aligning the phase of the main carriers for adjacent tracks for recording. This method is characterized in that each track is periodically allocated to a plural number of carriers of different frequencies, the number being equal to or larger than the maximum number of the tracks which the video head can override, and the allocated carriers are respectively angle-modulated with audio signals to be recorded in multiplex together with said modulated luminance signals.

The fourth magnetic recording method is a magnetic disk voice recording system of the type in which luminance signals and/or color signals of a video signal are recorded on a magnetic disk without forming void intervals between adjacent tracks; audio carriers of different frequencies are used for adjacent tracks on said magnetic disk and modulated audio signals are obtained by frequency-modulating or phase-modulating said audio carriers with audio signals of each track for recording the same in said adjacent tracks. This method is characterized in that when field-skip recording is conducted, the audio signals of the skipped fields are recorded separately, and the audio signals during such skips are read-out during the recording field so that they may be recorded in multiplex together with the audio signals of the recording fields on a magnetic disk.

The fifth magnetic recording method is of the type in which luminance signals and/or color signals of a video signal are recorded on a magnetic disk without forming void intervals between adjacent tracks, audio carriers of different frequencies are used for adjacent tracks on said magnetic disk and modulated audio signals are obtained by frequency-modulating or phase-modulating said audio carriers with audio signals of each track for recording the same in said adjacent tracks. This method is characterized in that when said video signals are recorded in field skip; the audio signals for the skipped fields are recorded separately; the audio signals of the skipped fields are read-out during the next field to be recorded so that they are recorded in multiplex together with the audio signals of the recording fields, the same track on the magnetic disk is repeatedly scanned by a reproduction magnetic head for a number equivalent to the number of skipped fields for reproduction; and audio signals for each field are separately reproduced from the multiplexed audio signal outputs obtained from the reproduction magnetic head by sequentially switching band filters.

BRIEF DESCRIPTION OF THE DRAWINGS

FIGS. 2(a) and (b) are explanatory graphs to show two examples of the relation between carrier frequencies.

FIGS. 3(a) through (c) are timing charts of the gate pulses to be used for selecting audio signal carriers.

FIG. 4 is a chart to explain the positional relation between tracks and a video head.

FIG. 13 is a graph to show an example of the frequency relation among carriers.

FIG. 14 is a timing chart of gate pulses to be used for selecting audio signal carriers.

FIG. 15 is an explanatory view to show the positional relation between tracks and a video head.

FIG. 16 is a schematic view to show the outline of the first and the third inventions as a preparation for the fourth and the fifth invention.

FIG. 17 is a graph to show a frequency array.

FIGS. 18 (a) through (c) are schematic views to show the recording system,

FIG. 19 a schematic view of a magnetic disk,

FIGS. 20 (a) and (b) schematic block diagrams of recording circuits to realize the audio signal recording system, FIGS. 21 (a) and (b) views to show the frequency array of the audio signals at skipping and multiplexed audio signals, and FIG. 22 is a schematic block diagram of a reproducing circuit to realize the audio signal reproducing method.

FIG. 23 is a schematic view to show a magnetic disk,

FIG. 24 is a schematic block diagram of a recording circuit to realize the audio signal recording method, and FIG. 25 a schematic block diagram of a reproducing circuit to realize the audio signal reproducing method.

DESCRIPTION OF THE PREFERRED EMBODIMENTS

The present invention will now be explained referring to the attached drawings.

Figure 1:
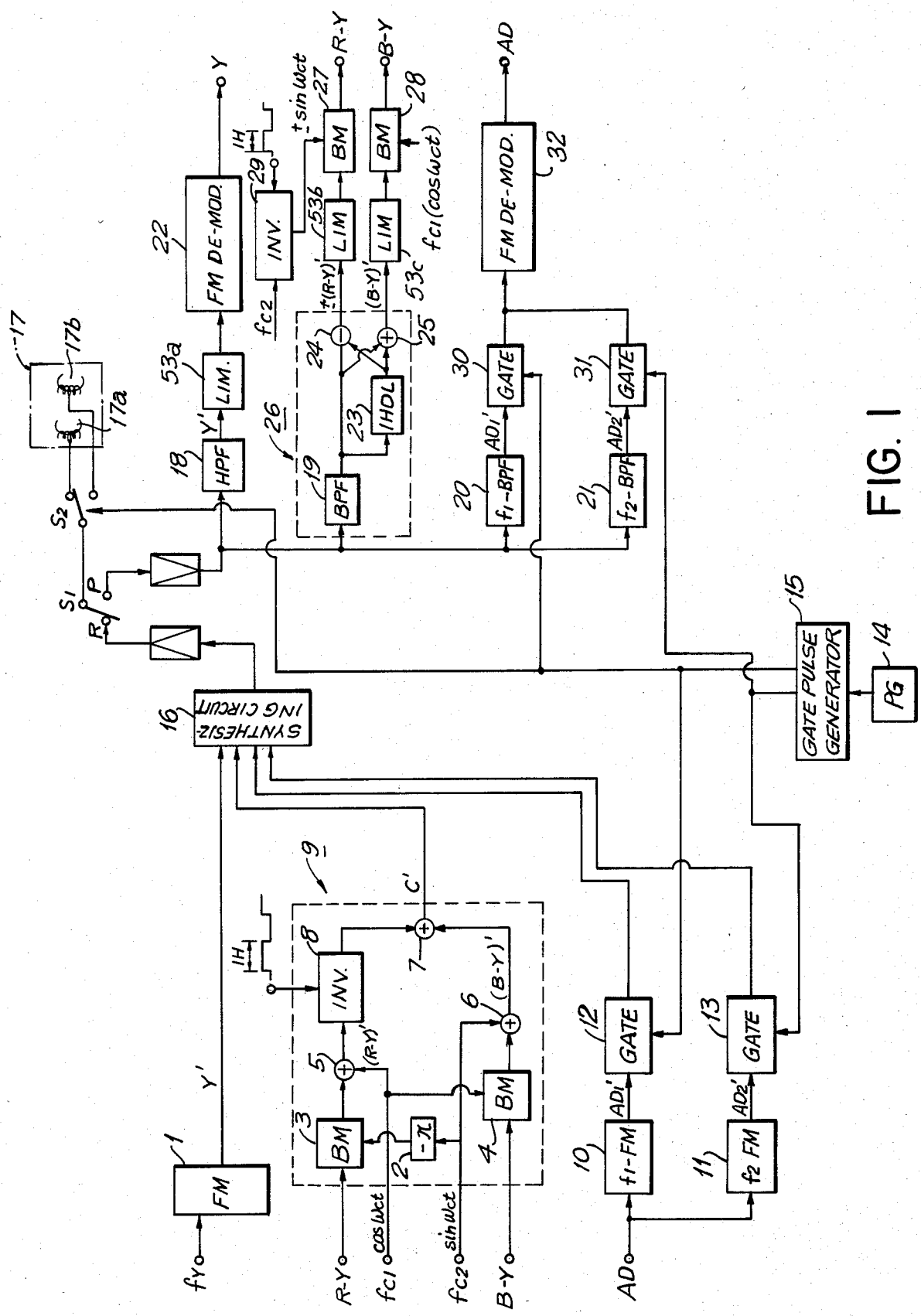
FIG. 1 is a block diagram to show an embodiment of the first invention.

FIG. 1 is a view to show the structure of an embodiment according to the first invention. The embodiment shows a magnetic disk recording system for recording-/reproducing wherein (a) audio signals are frequency modulated, (b) carriers for audio signals are set at two frequencies in a low band as shown in FIG. 2, and (c) color signals are phase-shifted.

Before proceeding into the explanation of embodiments according to the present invention, it would be better to describe a method of recording color signals by PM modulation. The PM recording system for luminance signals is disclosed in Japanese Patent Publication No. 56-51406 and Japanese Patent Laid-open Print No. 53-41126. In short, the PM system is characterized in that:

(1) the main carrier to be modulated by the luminance signals is synchronized with the relative movement between a video head and a magnetic medium;

(2) the modulation index mp is controlled to be 1.3 radian or less when the main carrier is PM modulated by luminance signals;

(3) these modulated luminance signals or PM luminance signals are recorded in such a way that the positions of vertical and horizontal synchronizing signals in the adjacent tracks become aligned with each other and the main carrier phases in adjacent tracks become also aligned.

According to this system, (i) As the carrier component amplitudes recorded in respective tracks are substantially the same because $mp \leq 1.3$ and the carrier components are of the same phase between tracks, the carrier components in the reproduced signals become constant even if the video head overrides the adjacent tracks;

(ii) because $mp \leq 1.3$, components of more than secondary side band may be disregarded, and because synchronous signals are aligned between tracks, the side band components of the reproduced signals merely become the composite of plural frames with a high correlation even if the video head overrides the adjacent tracks;

(iii) therefore, luminance signals can be demodulated free of crosstalk even if they are recorded without guard bands or overwritten partially or even if tracking errors occur in reproduction.

Color signals may possibly be recorded by PM modulation just like the luminance signals mentioned above but there arise various problems unique to color signals because there are two types of color signals, e.g. (R-Y) and (B-Y) color difference signals. More particularly, if different occupied bands are allotted to the two PM color signals, the color image signals as a whole after modulation become to occupy a very wide frequency band. One of the measures to overcome the problems is the method of making the central carriers of the two PM color signals identical and recording them alternately per one horizontal scanning period or by the line sequential method. In the case of the line sequential system, as the two PM color signals use the same occupied band, the color image signals as a whole will not need so large a frequency band, but one half of the color data will be missed at the time of recording. This method is therefore effective for the case which does not require a high picture quality. For reproduction, the missing data is supplemented by the adjacent color signals of horizontal scanning by using strong vertical correlation between horizontal scanning lines.

The second method is the PM modulation system of right-angle 2-phase wherein recording can be performed without color data missing and in the same occupied band zone by making the central carriers of the two PM color signals to have the same frequency and simultaneously by shifting the phases by 90°. The system using PM modulation is advantageous in that even if AM noises are caused in recording/reproducing by changes in the touch of the magnetic head, they will be removed by an amplitude limiter.

Referring now to FIG. 1, the recording system is described below. The switch for recording/reproduction mode S1 is switched to the R side. Auxiliary carriers fc1 and fc2 for the two color difference signals R-Y, B-Y which are perpendicular to each other are generated in such a way so as to synchronize with the rotational movement of the magnetic disk. A luminance signal Y is input to a FM demodulator to form a modulated luminance signal Y'. Color signals R-Y, B-Y, and their carriers fc1, fc2 are input to a right-angle 2-phase PM modulator 9 which comprises a phase shifter circuit 2, two balance modulators 3, 4, three synthetic circuits 5, 6, 7 and an inverter 8 in order to multiplex two PM color signals (R-Y)', (B-Y)' to obtain a signal C'. The inverter 8 of the PM modulator 9 inverts one of the PM color signals in alternate horizontal scanning to have the relation:

$$C' = \pm (R-Y)' + (B-Y)'$$

The inverter 8 also acts to interleave two PM color signals to each other in frequency. The modulation index in PM modulation of color signals may be practically feasible at $mp \approx 1.5$. In other words, the upper limit of mp is determined visually but as color signals have a band zone narrower than luminance signals, crosstalk will not very much disturb the view. The level of $mp \approx 1.5$, therefore, may be practically feasible even for ordinary PM modulation. In the case when PM modulation is carried out by using a balance modulator, as there is not a secondary side band wave in principle, an mp larger than for ordinary PM modulation will be permissible. If an mp increases although S/N improves, distortion occurs but it can be corrected to a certain degree. Compared with luminance signals, color signals may have a larger modulation index mp in recording with PM modulation. The PM modulation recording of color signals by means of a balance modulator has the merit that it does not require correction for distortion so far as the relation $mp \leq 1.3$ holds without crosstalk.

As to audio signals, the scanning width of a video head is identical with that of tracking pitch in the tilted azimuth system and if tracking errors occur at the time of reproduction, the head will come to override two tracks at most. Therefore, the two carriers f1, f2 will be sufficient for audio signals.

FIG. 2 shows examples of the frequency spectrum of video and audio signals wherein the example shown in FIG. 2(a) is superior to another one in FIG. 2(b) in sound quality because the former can have a wider deviation in voice. The latter example of FIG. 2(b), on the other hand, is superior to the former in that audio signals can be easily prevented from interfering with luminance signals. Audio signal AD is input to the two FM modulators 10, 11 having the carriers f1, f2 and each FM audio signal AD'1, AD'2 is passed through gates 12, 13. FM audio signals having carriers different sequentially like f1→f2→f1→f2 .... are obtained by enabling respective gates for each track periodically. ON/OFF switching of gates is controlled by gate pulses for the timing as shown in FIGS. 3 (a) and (b) by feeding the gate pulse generator 15 with pulses output from a pulse generator 14 which generates a pulse for every one rotation of the magnetic disk. FIG. 3 (c) shows the output from a pulse generator 14. Alternatively, it is possible to change carriers by using only one FM modulator, inputting it with audio signals and level signals of two levels together and switching the DC level periodically.

The above-mentioned various signals Y', C', AD'1 and AD'2 are synthesized by a synthesizing circuit 16, amplified suitably, fed to a video head 17 comprising two magnetic heads 17a and 17b having different azimuth and recorded in a spiral form. The two magnetic heads 17a and 17b are naturally alternately switched for one rotation of the magnetic disk by a switch S2. Respective carriers for color signals are aligned in phase between tracks and simultaneously the recording positions of at least horizontal signals are aligned between tracks.

Explanation will now be given to the reproduction system. By turning the switch S1 to the side of P and switching the switch S2 alternately for every track, the reproduction output from the video head 17 is fed to a high pass filter 18 for FM luminance signals, a band pass filter 19 for PM color signals and two band pass filters for FM audio signals 20, 21 while FM luminance signals are demodulated by a conventional FM demodulator 22. The multiplexed PM color signals are separated into $\pm(R - Y)'$ and $(B - Y)'$ by a separator 24 comprising a delay line 23 for one horizontal scanning time, a subtractor 24 and an adder 25 and then synchronously detected by balance modulators 27 and 28 respectively. Among phase reference signals to be used for synchronous detection, the signals fc2 corresponding to the PM color signal $\pm(R - Y)'$ which has been inverted for one horizontal scanning at the time of recording, is inverted for one horizontal scanning by an inverter 29 and then fed to the balance modulator 27. A burst signal of the color signals in a blanking period among the reproduction outputs may be used as the phase reference signal. Or a phase reference signal may be formed by reproducing a reference signal which has been recorded in an auxiliary track or a preceding track on the magnetic disk by an auxiliary head and creating a new signal based thereupon. According to this method using reference signals, faithful synchronization with rotational changes is obtained. Therefore, if this method is used for forming carriers fc1 and fc2 for color signals, the carrier phases can be well aligned between tracks, thereby shortening the recording wavelength. When the reference signal is recorded on an auxiliary track, it is possible to record the central carrier itself just like the multiplex recording of reference signals, as there is no interference with PM color signals. This simplifies the circuit construction for the reproduction system.

The FM audio signals in the reproduction signals are separated by band pass filters 20, 21 for each carrier frequency, passed through gates 30, 31 and fed to the FM demodulator 32 as each gate is enabled periodically for each track.

ON/OFF switching of the gates is controlled with gate pulses from the gate pulse generator 15 of the recording system so that filter output, which corresponds to the audio signal carrier of the track for reproduction alone, should be input to the FM demodulator 32. Therefore, as shown in FIG. 4, even if the video head 17 overrides an adjacent track Tn−1 (or Tn+1), as only the gate 30 is enabled, the audio signal having the carrier f2 will not be demodulated while the audio signal of the desired track Tn alone will be obtained without generating any crosstalk.

Figure 5A:
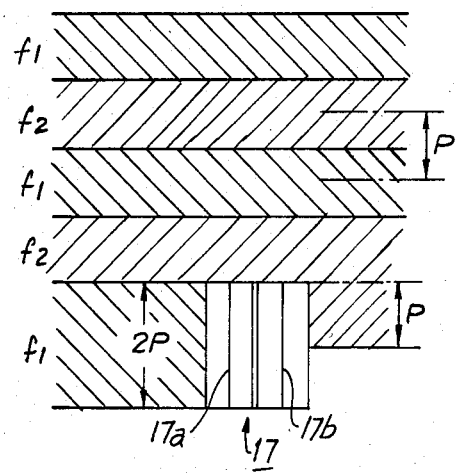
FIGS. 5(a) and (b) are explanatory views in the case where the scanning width is wider than a track pitch.
Figure 5B:
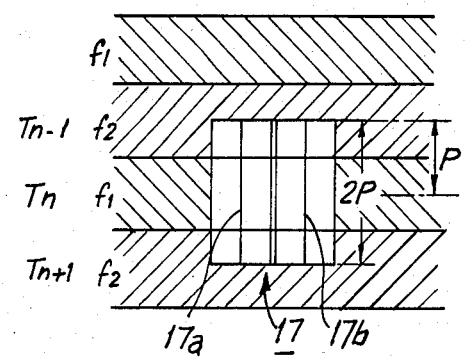

The above explanation is related to the case where the scanning width of the video head 17 is one track pitch, but the same is applicable to the case where the width is more than one track pitch. No matter how wide the track width may be at the time of recording, there will be no problems because the portion which protrudes over the width of the track in recording is overwritten and erased at the next track recording. For reproduction, the scanning width of a head can be extended beyond the width of a track so far as it will not override other tracks of the azimuth identical with the desired track. For instance, if it is assumed that the scanning width of a video head is 2 track pitches, at the time of recording one track pitch P is overwritten as shown in FIG. 5(a) and at the time of reproduction, the track is positioned at the center of the video head 17 as shown in FIG. 5(b). In the case of FIG. 5(b), the portion protrudes from the desired track Tn and overrides two tracks Tn−1, Tn+1 on both sides, but no crosstalk will be caused thanks to the azimuth effect for luminance signals, the PM modulation for color signals and the difference in carrier frequencies for audio signals.

In the above embodiments, in order to interleave two PM color signals in frequency to each other, the PM color signal (R - Y)' or (B - Y)' was inverted after modulation for each horizontal scanning period. The same effect can be obtained if the auxiliary carrier fc1 or fc2 is inverted for each one horizontal scanning period before it is fed to a modulator. As two PM color signals can be multiplexed by interleaving two color signals to each other in frequency and separating them by a comb line filter at the time of reproduction, the same effect can be achieved by advancing the phase of one of the PM color signals by 90° per one horizontal scanning period and delaying the phase of the other signal by 90°. In this case, it is also possible to shift the phase of the PM color signal itself after modulation or to shift the phase of the auxiliary carrier before it is fed to a modulator. In short, two PM color signals should be shifted in phase by 180° relative to each other for each of the horizontal scanning periods. At the time of reproduction, however, the phase of the phase reference signal corresponding to the separated PM color signals should be phase-shifted for each horizontal scanning period in order to align the polarity thereof, and the phase angle thereof is determined by the angle at which the PM color signal is shifted at the time of recording. A balance modulator is used for the PM modulation and the PM demodulation in the above embodiment because it makes the circuit construction simple and does not cause side band waves of more than secondary importance. But in principle, any PM modulation system and PM demodulation system may be used.

Figure 6A:
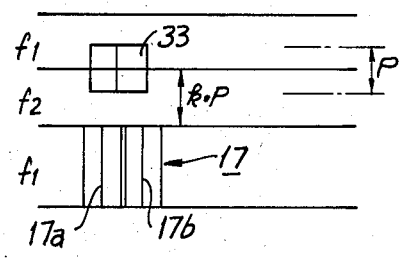
FIGS. 6(a) through (c) are schematic views to show examples of tracking.
Figure 6B:
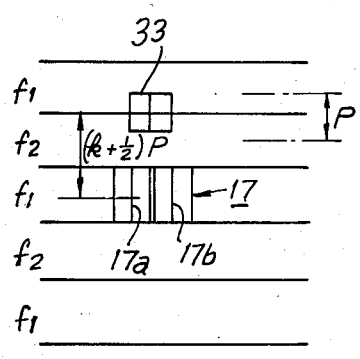
Figure 6C:
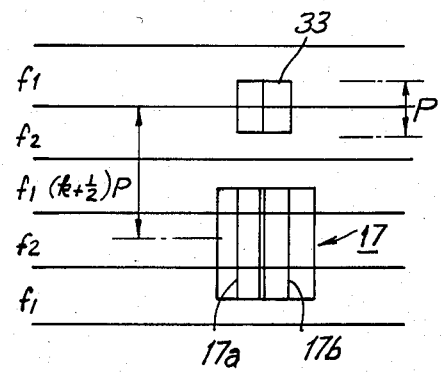
Figure 7:
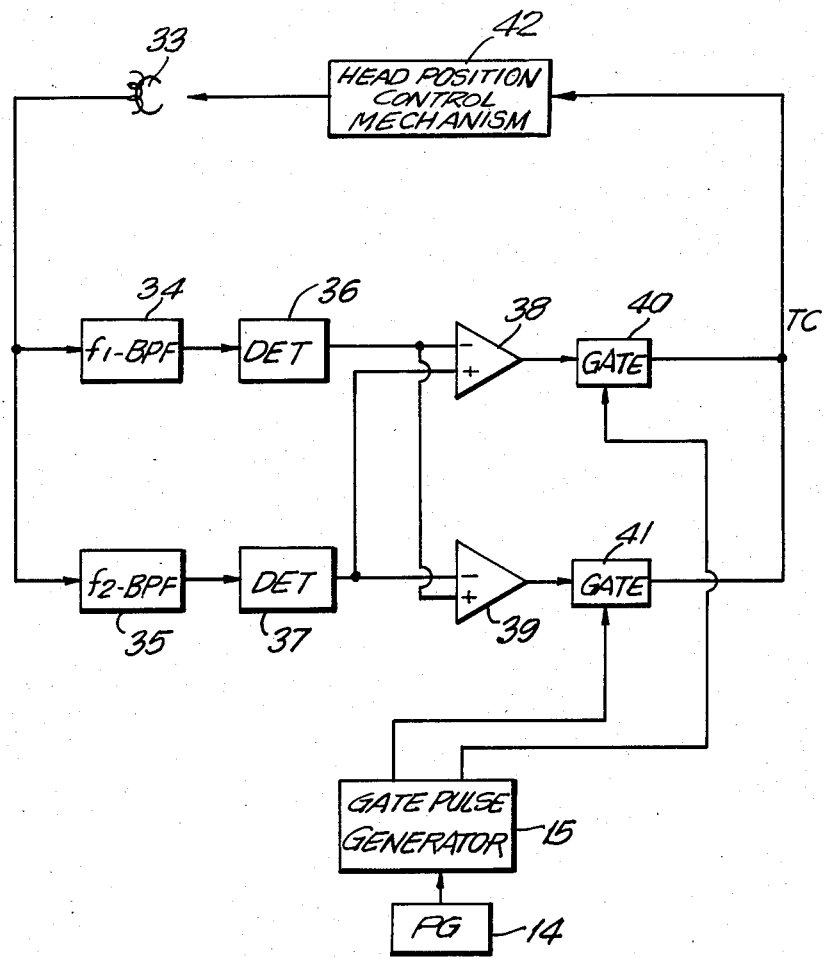
FIG. 7 is a view to show the circuit structure for a tracking control.

Concerning the second invention, description will now be given to tracking servo control. Due to the development of a recording system which does not cause crosstalk of voices and picture images even if a video head overrides adjacent tracks, it becomes possible to increase the density of recording but it still is necessary to use tracking servo control for cases such as extremely narrowing the track pitches or editing by assembling. Therefore, if a carrier audio signal can be used as a pilot signal for tracking, the efficiency of audio signal carriers will be heightened considerably for the system in such cases where below the PM color signal band zone or in a band zone between the FM luminance signal band zone and the PM color signal band zone carriers having different frequencies for each track are used for FM or PM recording audio signals. As is the case shown in FIG. 1 where an audio signal carrier having two frequencies is used, a magnetic head 33 for tracking which overrides only two tracks is used integrally with a video head as shown in FIG. 6, the end of the video head 17 and the center of the magnetic head 33 deviate by k track pitch (k =0, 1, 2, . . .) in the recording system as shown in FIG. 6(a), and the centers of heads 17, 33 deviate from each other by [k+½] track pitch for the reproducing system as shown in FIG. 6 (b) or (c). For controlling, as shown in FIG. 7, the reproduction output from the magnetic head 33 for tracking is fed to band pass filters 34, 35 of f1, f2 first and the output levels thereof are detected by level detectors 36, 37. Then, the magnitude of the detected levels is compared by comparators 38, 39. The outputs from comparators 38, 39 are alternately selected by a gate 40 for each rotation of the magnetic disk to form a tracking control signal TC, which is fed to a head position control mechanism 42 so that the detection levels of f1 and f2 become identical to each other.

Figure 8:
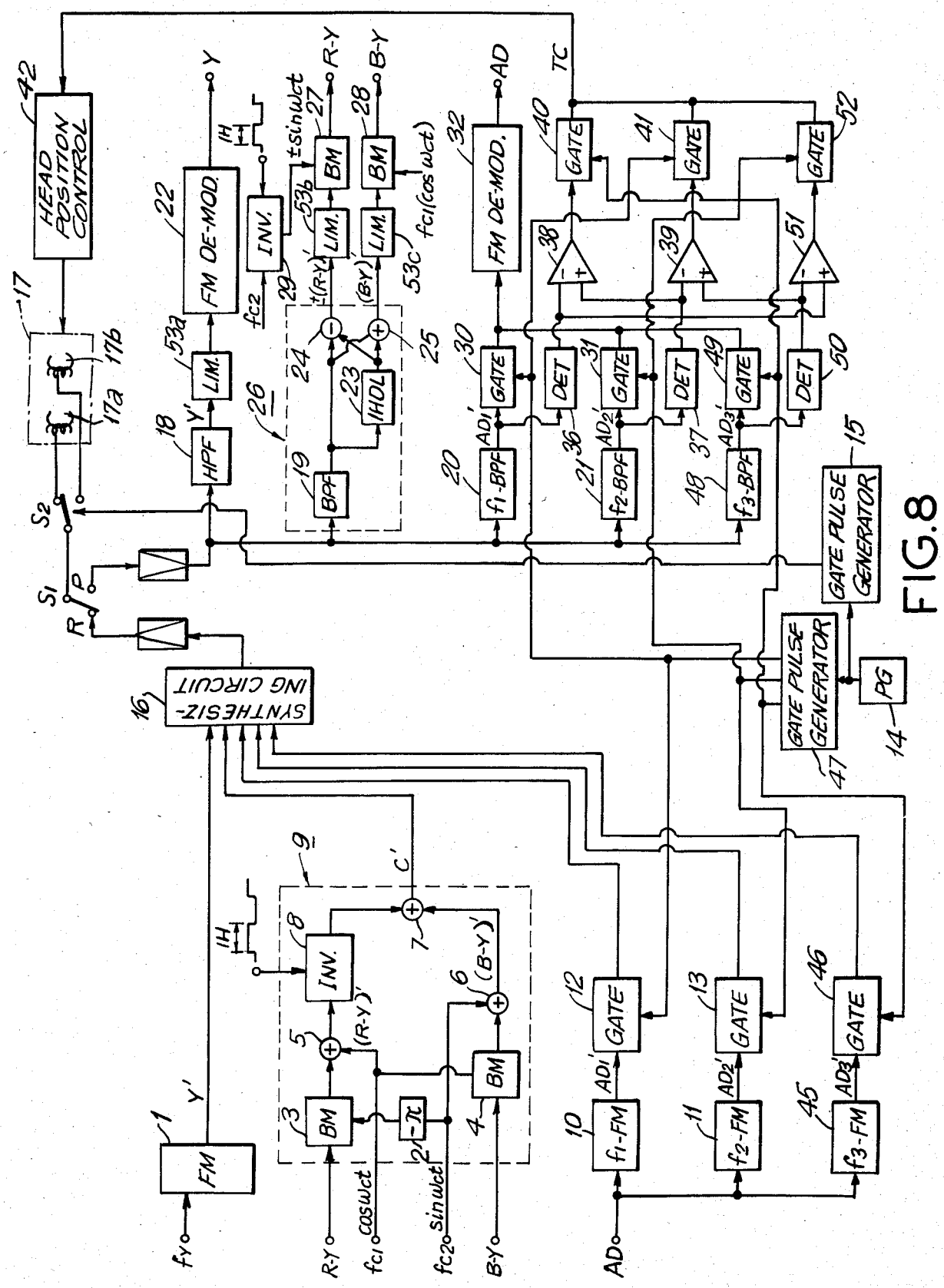
FIG. 8 is a block diagram to show an embodiment of the second invention.
Figure 9:
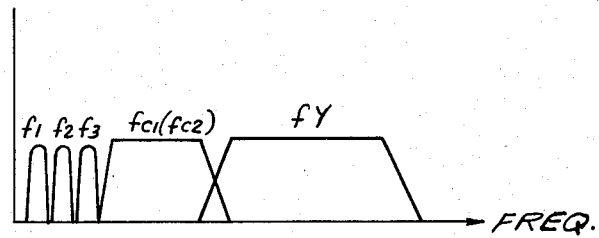
FIG. 9 is a graph to show an example of the frequency relation among carriers.
Figure 10A:
FIGS. 10(a) through (d) are timing charts of gate pulses to be used for selecting audio signal carriers.
Figure 10B:
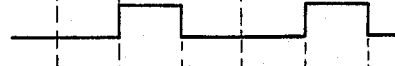
Figure 10C:
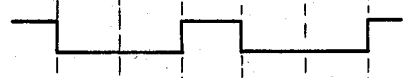
Figure 10D:
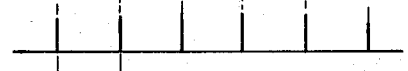
Figure 11:
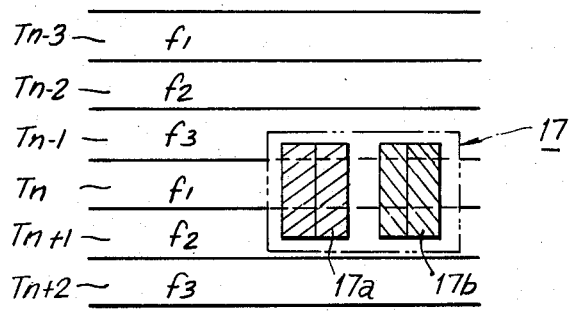
FIG. 11 is an explanatory view to show the positional relation between tracks and a video head.

On the other hand, when the scanning width of a video head 17 is wide and the head is positioned as shown in FIG. 5 (b), it is not necessary to use the magnetic head for tracking if the audio signal carrier is made to use three frequencies f1, f2 and f3 and tracking servo control is applied for reproduction. FIG. 8 shows an example of construction of recording and reproducing systems. The embodiment of FIG. 8 is fundamentally different from the one shown in FIG. 1 in that an FM modulator 45 which FM modulates the audio signal carrier for f3, a gate thereof 46, a gate pulse generator 47 of ternary such as a ring counter, a band pass filter 48 for f3 and a gate thereof 49 are added while level detectors 36, 37, 50 for each level f1, f2, f3, three comparators 38, 39, 51, three gates 40, 41, 52 and a head position control mechanism 42 are added for tracking. In this embodiment, respective audio signal carriers f1, f2, f3 are set at a low band zone as shown in FIG. 9, and allotted to each track periodically as f1→f2→f3→f1→f2 . . . as shown in FIG. 11. The allotment is performed by periodically enabling three gates 12, 13 and 46 for each track. In other words, each gate is controlled by a gate pulse having timing shown in FIGS. 10 (a), (b) and (c). FIG. 10 (d) shows the output from the pulse generator 14. The FM modulation of three types of voice can be conducted by one FM modulator by adding level signals of three levels to the audio signals just like the one described for FIG. 1. The modulated audio signals among the reproduction signals are separated for each carrier frequency by each of the band pass filters 20, 21, 48, fed to gates 30, 31, 46, and fed to an FM demodulator 32 by periodically enabling each gate for each track. ON/OFF switching of the gate is controlled by a gate pulse from the gate pulse generator 47 of the recording system so that only the filter output corresponding to the audio signal carrier of the track to be reproduced is fed to the FM demodulator 32. Accordingly, even if the video head 17 overrides adjacent tracks Tn−1, Tn+1 as shown in FIG. 11, only one gate 30 is enabled, thereby not demodulating audio signals having the carriers f3, f2. Only the audio signals of the desired track Tn alone can be obtained without causing crosstalk at all. In tracking servo control for reproduction, the output levels of band pass filters 20, 21, 48 are detected by level detectors 36, 37, 50, the magnitude of detected levels is compared with comparators 38, 39, 51, and only the comparator output which corresponds to the desired track alone is selected by gates 40, 41, 52 to form a tracking control signal Tc. With the head position shown in FIG. 11, only gate 41 is enabled to compare the levels of f3 and f2 for tracking on Tn.

Although a recording system and a reproducing system are integral in the block diagrams of FIGS. 1 and 8, this invention may be applied to a system where a recording system is separate from a reproducing system so long as it uses a common recording medium.

In the description of the first and second inventions referring to embodiments, the luminance signals are FM modulated while color signals are PM modulated in right-angle 2-phase. Even for audio signals, it is better to use angle modulation for recording so long as it employs an amplitude limiter because the influence from AM noise is smaller. In FIGS. 1 and 8 the reference numerals 53a through 53c denote amplitude limiters.

As described in the foregoing, according to the first and the second inventions, in the case of a magnetic video recording where a video head may override adjacent tracks without causing trouble for the reproduction of picture images, audio and video signals can be recorded in multiplex without causing crosstalk in voice. According to the second invention, by using the carrier of the audio signal which is to be recorded in multiplex with a color video signal, tracking servo control is applied at the time of reproduction, thereby enabling reproduction of tracking at a high precision.

Figure 12:
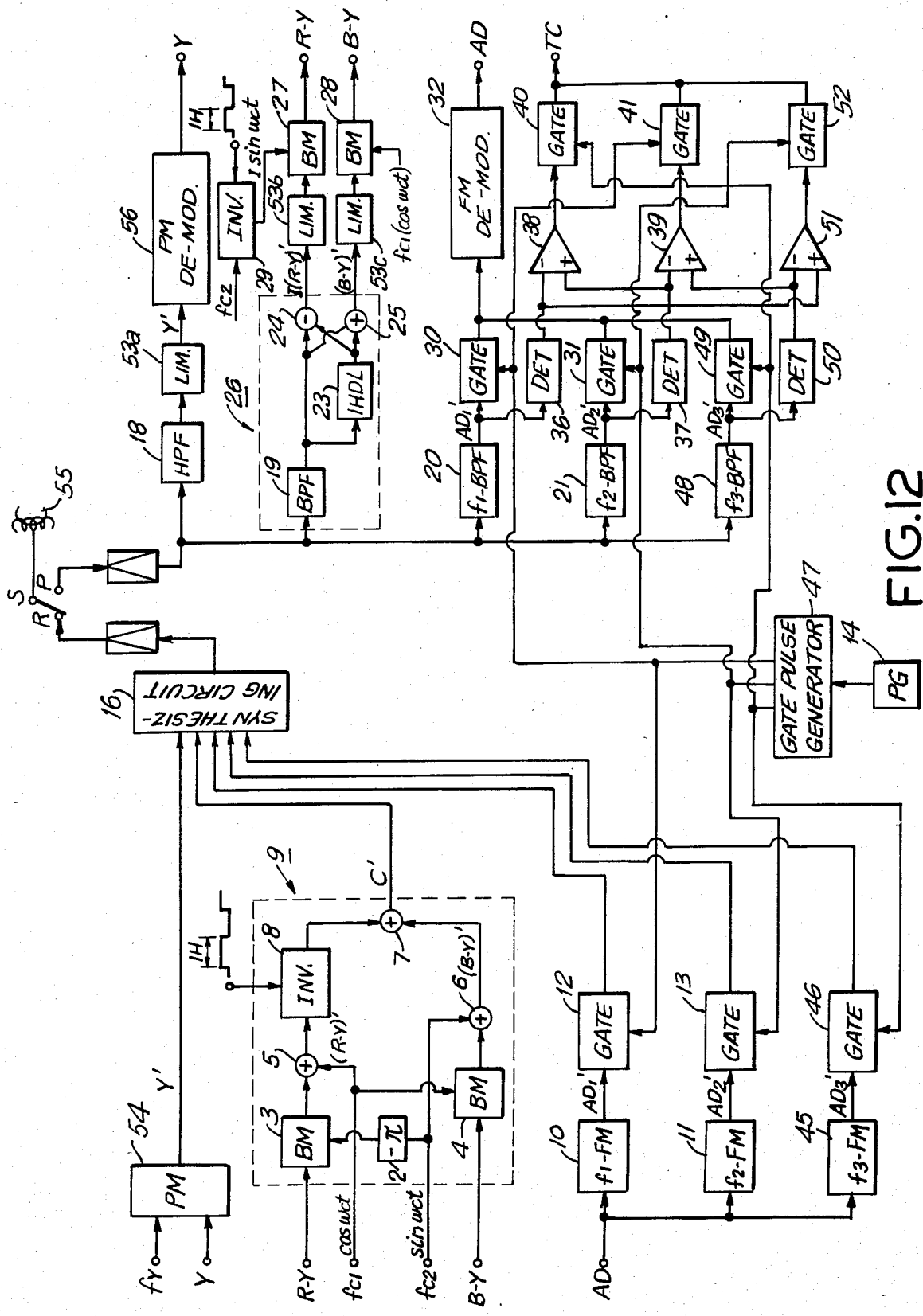
FIG. 12 is a block diagram to show an embodiment of the third invention.

The third invention will now be described referring to the attached drawings. FIG. 12 is a view to show construction of an embodiment according to this invention. This embodiment is an example of a magnetic disk video recording device for recording/reproduction which is characterized in that:

(a) the width of a video head is twice that of a track pitch;

(b) audio signals are frequency modulated;

(c) the carrier for audio signals is set at a low frequency band zone as shown in FIG. 13;

(d) color signals are phase modulated; and (e) the carrier for audio signals is used for the applying tracking servo control at the time of reproduction.

Referring to FIG. 12, the recording system is first described. The recording/reproducing mode switch S is turned to the side of R. A main carrier fy for the luminance signal Y and the auxiliary carriers fc1 and fc2 for two color signals R-Y, B-Y, which are perpendicular to each other, are generated in a manner to synchronize the rotational changes of the magnetic disk to form a modulation/luminance signal Y' by inputting a carrier fy and the luminance signal Y into a phase modulator 54. The color signals R-Y, B-Y and the carriers thereof fc1 and fc2 are input at a phase shift circuit 2, a right-angle 2-phase phase-modulator 9 comprising two balance modulators 3, 4, three synthesizers 5, 6, 7 and an inverter 8 to form a signal C' all of which are multiplexed by two modulation color signals (R-Y)' and (B-Y)'. The modulation index mp of the phase modulation corresponding to the luminance signal is $mp \leq 1.3$. The inverter 8 of the right-angle 2-phase phase modulator 9 inverts input signals once in every two horizontal scanning to have the relation $$C' = \pm (R - Y)' + (B - Y)'$$

in order to make separation at the time of reproduction possible. The modulation index mp may be practically feasible at the level $mp \approx 1.5$ for phase modulation to color signals. In other words, the upper limit of mp is determined visually but as color signals have a band zone narrower than luminance signals, crosstalk will not very much obstruct viewing. The level of $mp \approx 1.5$, therefore, may be practically feasible even for ordinary PM modulation. In the case where phase modulation is carried out by using a balance modulator, as there is not a secondary side band wave in principle, an mp larger than for ordinary phase modulation will be permissible. If mp increases, although S/N improves, distortion occurs, but it can be corrected. Compared with luminance signals, color signals may have a larger modulation index mp in recording by phase modulation. The phase modulation recording of color signals by means of a balance modulator has merit in that it does not require correction for distortion so far as the relation $mp \leq 1.3$ holds and it is free of crosstalk.

As to audio signals, as the video head overrides 3 tracks at most when the width of the head is equivalent to 2 tracks, three carriers f1, f2, f3 will be sufficient for audio signals. Therefore, an audio signal AD is input to three FM modulators 10, 11 and 45 having the carriers f1, f2 and f3, respective modulated audio signals AD1', AD2' and AD3' are fed at gates 12, 13, 46 and modulated audio signals having carriers which are sequentially different from each other like f1→f2→f3→f1→f2 ... are obtained by enabling each gate periodically for each track. ON/OFF switching of gates is controlled with gate pulses having the timing shown in FIGS. 14(a), (b) and (c) by feeding pulse output from a pulse generator 14 which generates one pulse for each rotation of the magnetic disk to a gate pulse generator 47 such as a ring counter. FIG. 14 (d) shows outputs from the pulse generator 14. Alternately, it is possible to vary carriers by using only one FM modulator, inputting the same with audio signals and level, signals of three levels and switching the levels periodically.

Those various signals are synthesized by a synthesizer 17, amplified suitably and then fed to a video head 55. Needless to say, carriers for luminance signals and color signals are aligned in phase between tracks and recording positions of vertical and horizontal synchronizing signals are aligned between tracks.

An explanation will now be given on the reproduction system. When the switch S is turned to the side of P, the reproduction output from a video head 55 is fed to a high pass filter 18 for luminance signals, a band pass filter 19 for color signals and three band pass filters 20, 21, 48 for audio signals and modulated luminance signals are demodulated by a conventional demodulator 56. The demodulated color signals which have been multiplexed are separated into $\pm (R - Y)'$ and $(B - Y)'$ by a separator 26 comprising a delayed line 23 for one horizontal scanning time, a subtractor 24 and an adder 25 to be synchronously detected by balance demodulators 27, 28 respectively. Out of the reference phase signals for the synchronous detection, the signal fc2 which corresponds to the modulated color signal $\pm (R - Y)'$ is inverted by an inverter 29 for every one horizontal scanning before being fed to the balance modulator because it was inverted for every one horizontal scanning at the time of recording. The color signal in the blanking period among reproduction outputs may be used in a burst signal as a reference phase signal. Or a reference phase signal may be created based upon a signal obtained by reproducing the reference signal recorded on an auxiliary track or a preceding track on the magnetic disk. As this method using reference phase signals synchronizes faithfully with rotational changes of the magnetic disk, if the method is applied to forming carriers fy, fc1, fc2 for video signals, the phases of carriers are well aligned, thereby shortening the recording wavelength.

The modulated audio signals out of the reproduction signals are separated by respective band pass filters by carrier frequencies, passed to gates 30, 31, 49 and fed to an FM demodulator 32 by periodically enabling gates for each track. ON/OFF switching of gates is controlled with gate pulses from a gate pulse generator 47 of the recording system to input only the filter output which corresponds to the audio signal carrier of the desired track to the FM demodulator 32. Therefore, even if the video head 55 overrides adjacent tracks Tn−1, Tn+1 as shown in FIG. 15, only the gate 30 is enabled without demodulating audio signals having the carriers f3 and f2 but offering the audio signal of the desired track Tn, thereby causing no crosstalk.

It should be noted here on tracking servo control: Although the recording density was remarkably improved due to the development of a recording system which is free of crosstalk trouble in video and audio signals even if a video head overrides adjacent tracks, it is still necessary to use tracking servo control when the track pitch has to be made extremely narrow for a higher density or when assembling editing is needed.

If audio signals are FM recorded by using carriers which have different frequencies for each track, the modulated audio signals can be conveniently used as a pilot signal for tracking. In the embodiment shown in FIG. 12, the output levels of the respective band pass filters 20, 21, 48 are detected by level detectors 36, 37, 50, the detected levels are compared by comparators 38, 39, 51 and comparator outputs which correspond to the desired track alone are selected by gates 40, 41, 52 to form a tracking control signal Tc. At the heat position shown in FIG. 15, the gate 41 alone is enabled to compare f3 with f2 in level for tracking to Tn.

As has been described in the foregoing, according to the third invention, in the magnetic video recording which can reproduce without troubles even if a video head overrides adjacent tracks, audio signals can be recorded in multiplex with video signals without causing crosstalk in voice.

The above description proposed a system for audio recording carriers having different frequencies which are periodically allotted to tracks so that the carrier of voice recorded in each track will be different from the carrier of adjacent tracks which a video head overrides at the time of reproduction, and the carriers are angle-modulated by audio signals, to be multiplex-recorded with modulated video signals.

Referring to FIG. 16, description will now be given to a case where modulated audio signals are recorded by frequency modulation and reproduced by a reproduction magnetic head of a scanning width which overrides adjacent tracks on both sides. As a magnetic head 57 overrides adjacent tracks on both sides, audio carriers f1, f2 having different frequencies are used; as shown in FIG. 16, one of the audio carries f1 is recorded by frequency modulation with the audio signal recorded on the track T1 and then the other audio carrier f2 is recorded by frequency modulation by the audio signal recorded on the next track T2. In this way, the modulated audio signals which are obtained by frequency-modulating audio carriers f1, f2 having different frequencies are recorded alternately on the adjacent tracks. The modulated audio signals F1, F2 which are obtained by frequency-modulating audio carriers f1, f2 of different frequencies are recorded in multiplex either in the band zone E (100–200 KHz) which is lower than the color signal C, or in the band zone F (several hundreds KHz) which is between the color signals C and the luminance signal Y, or in the band zone G (several MHz) which is higher than the luminance signal Y.

This audio recording system is very effective in improving the efficiency of recording zones of a magnetic disk or the recording density in a broader sense because it does not require additional tracks exclusive for voice as no crosstalk will occur in voice between adjacent tracks even if a magnetic head of a larger width is used for scanning in reproduction. The fourth and the fifth inventions propose a recording/reproducing system which with simple circuits can record/reproduce voice as continuous signals at the time of field skip recording in such a recording system as mentioned above without using guard bands.

The first embodiment according to the fourth and the fifth invention will now be described. Description is given for the case where recording is performed by frequency modulation for audio recording and reproducing systems. It is assumed that in field skipping, one field is skipped for one time and the video signals of the fields marked with odd numbers in FIG. 18 such as a1, a3, a5 . . . are skipped while those with even numbers such as a2, a4, a6 . . . are recorded. It is also assumed that one field is recorded in one track of a magnetic disk 58 in FIG. 19 and tracks are formed on the disk 58 in the form of concentric circles as shown in the figure.

Figure 19:
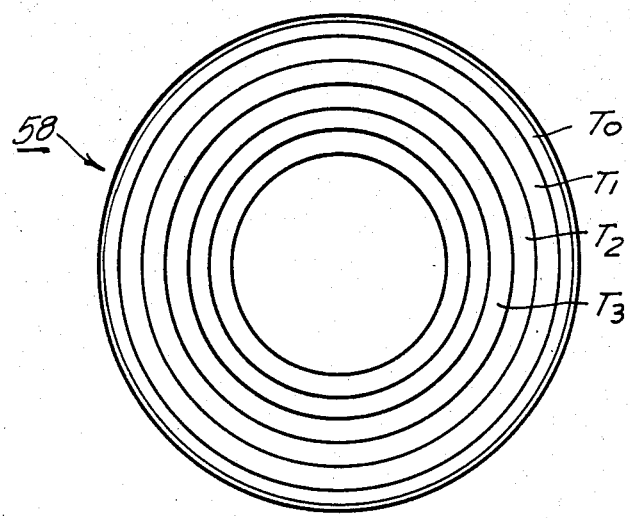
Figure 21A:
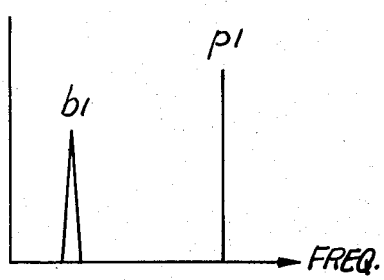
Figure 21B:
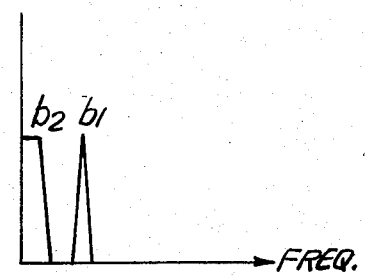

In the first embodiment of the audio recording system as the audio signals b1, b3, b5 . . . of the fields which are to be skipped at the time of field skip will be skipped together with the video signals a1, a3, a5 . . ., there is provided an auxiliary track T0 on the outermost periphery of the disk 58 as shown in FIG. 19 in order to temporarily store the audio signals b1, b3, b5 . . . which otherwise will be missed at the time of skipping. The audio signals b1, b3, b5 . . . are temporarily stored by a recording auxiliary head on this auxiliary magnetic disk T0 at the time of field skip. For instance, when an audio signal b1 is to be recorded, the signal b1 is frequency-modulated by a modulator 59 with a carrier of a frequency which is higher than the audio signal b2 of the next field to be recorded, passed through a switch 60 which is enabled during the skip period, fed to an amplifier 61 together with a reference signal P which is to be recorded on the same auxiliary track T0 and necessary for video signal phase modulation/demodulation and finally recorded by a recording auxiliary head 62. FIG. 21 (a) shows the frequency allocation of audio signals b1 at the time of skipping.

Figure 18A:
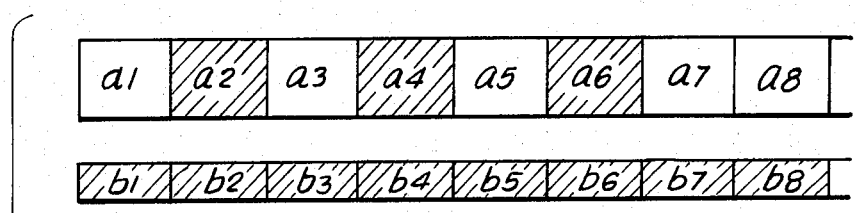
FIGS. 18(a) through 22 relate to an embodiment of the fourth invention.
Figure 18B:
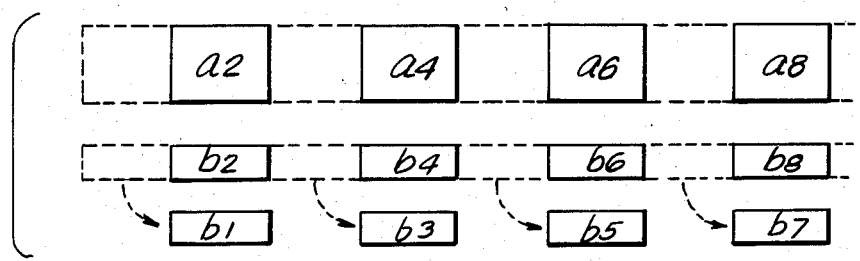
Figure 18C:
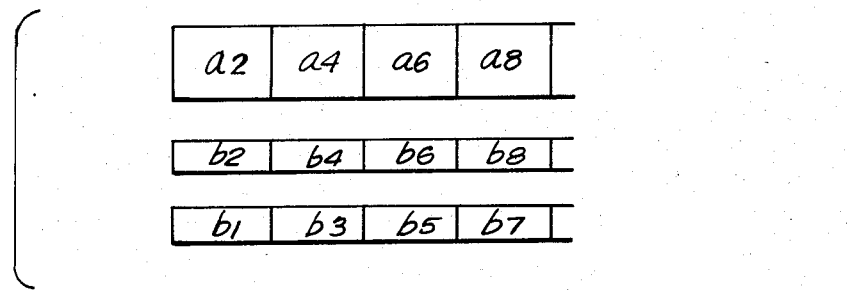
Figure 20A:
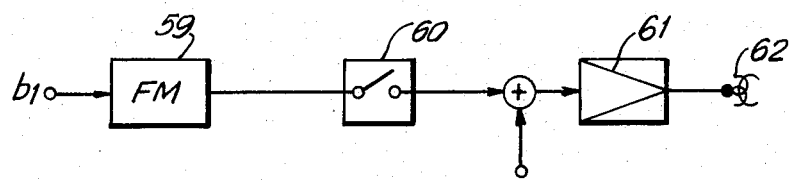
Figure 20B:
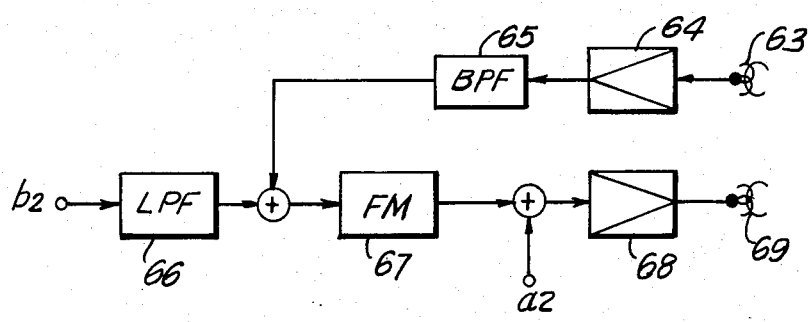

The audio signal b1 which is temporarily recorded on the auxiliary track T0 at the time of skipping is taken out by a reproduction auxiliary head 62 which is closely placed on the track T0 via an amplifier 64 and a band filter 65 when an audio signal b2 of the next field (in FIG. 18 (a) the second field) is to be recorded on a track of the magnetic disk, and recorded by the recording magnetic head (or a video head) 69 in multiplex with the audio signal b2 of the next field. As shown in FIG. 20, the audio signal b1 taken out by the head 63 through the band filter 65 is mixed with the audio signal b2 of the next field which has been passed through a low band filter 66, frequency-modulated by a modulator 67, passed through an amplifier 68 together with a modulated video signal a2 and finally recorded on a track of the magnetic disk by using a recording magnetic head 69. In short, as shown in FIGS. 18 (b) and (c), audio signals b1 and b2 are recorded on the same track and the frequency allocation becomes as shown in FIG. 21. These audio signals may be recorded by inserting in a low band zone (100–200 KHz) of modulated chromaticity signals, a frequency band zone (several hundreds KHz) between modulated chromaticity signals and modulated luminance signals, or the high band zone (several MHz) of modulated luminance signals.

The recording system for video signals may be the PM modulation system mentioned above or the tilted azimuth recording system by FM modulation or any of the recording systems which are improved to have no crosstalk even if recording is performed in high density without guard bands.

Figure 22:
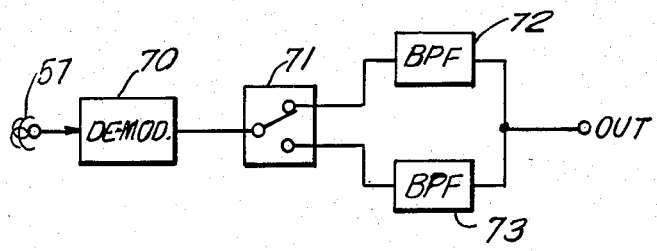
Figure 23:
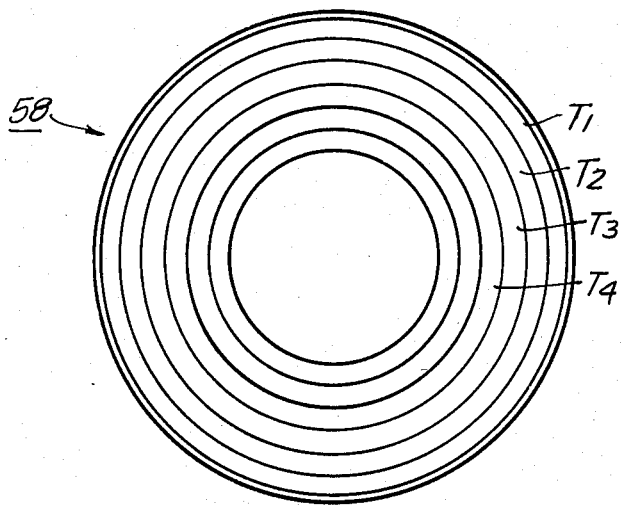
FIGS. 23 through 25 relate to other embodiments according to the fourth and the fifth inventions.
Figure 24:
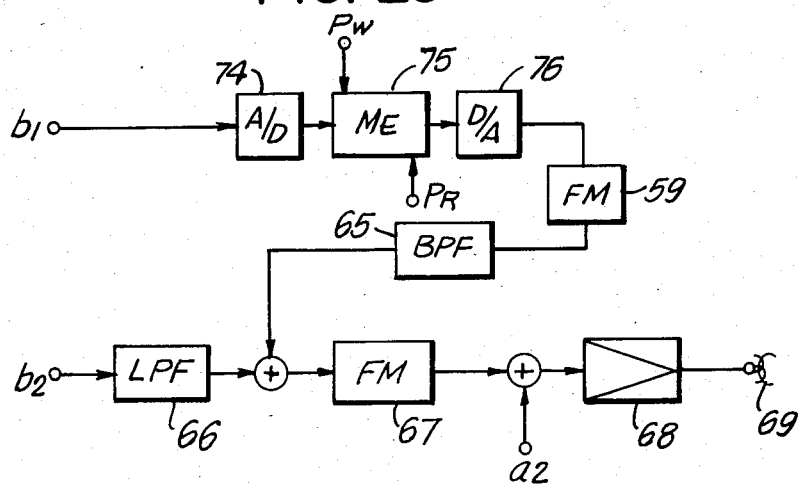
Figure 25:
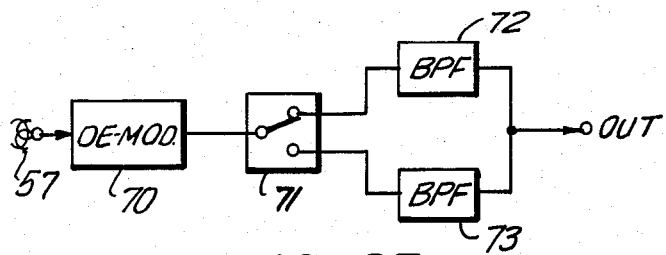

The audio reproducing system which is used to reproduce the audio signals which are recorded in multiples on tracks of a magnetic disk in the above-mentioned manner will now be described When audio signals are to be reproduced, as the influence from crosstalk in adjacent tracks can be disregarded in this system as mentioned above, a reproduction magnetic head 57 having a scanning width larger than that of a track can be used for reproduction as shown in FIG. 16. In this embodiment, the scanning width of the head 57 is the one which overrides adjacent tracks (i.e. extending over three tracks). For reproducing, this wide magnetic head is repeatedly run for scanning over one track for the number of times equivalent to the number of skipped fields. As the number of skipped field is one on this embodiment, the head is run over a track twice or for one additional time. Therefore, the same video signals are obtained for two fields by this repeated scanning operation. An embodiment of audio reproducing circuits is shown in schematic block diagram in FIG. 22 wherein audio signals b1 of the skipped field and the audio signals b2 of the recorded field are taken out separately as the signals are passed through from the reproducing magnetic head 57 to a demodulator 70 and band filters having different frequency bands 72, 73, 71 are switched for connection. In other words, at the first scanning, the audio signal b1 of the skipped field is taken out, and at the second scanning the audio signal b2 of the next recorded field is taken out. In this manner, audio signals which are recorded in multiplex on tracks of a magnetic disk are reproduced from the state shown in FIG. 18 (c) to the state shown in FIG. 18 (a).

Although an explanation is given for the case where a skipped space is one field in the above recording and reproducing embodiment for convenience's sake, the number of fields to be skipped is not limited to one. Similarly, although audio signals which are frequency modulated are recorded on a magnetic disk in the above embodiment, phase modulation may be used for a similar effect.

As described in the foregoing, according to this recording system as skipped audio signals are temporarily recorded on an auxiliary track and then read out at the next recording field so as to be recorded in multiplex with audio signals of the recording field, an additional track for skipped signals becomes unnecessary, thereby contributing to a higher density in recording. According to the reproducing system mentioned above, as the audio signals which have been recorded in multiplex by the recording method described above are separated and sequentially taken out for reproduction by means of the switching of band filters, it can reproduce continuous audio signals with a simple construction even though they are recorded intermittently or by field skipping.

The second embodiment according to the fourth and the fifth inventions will now be described referring to FIGS. 16 through 18, and FIGS. 23 through 25.

In this embodiment, as the audio signals b1, b3, b5 of the fields which are to be skipped at the time of field skipping recording are skipped together with video signals a1, a3, a5 . . ., a memory 75 is provided in order to record those skipped audio signals so as not to interrupt the audio signals. In this memory 75, the audio signal b1 of the skipped field is stored temporarily via an A/D converter 74 (an analog/digital converter). This write-in operation is performed with timing pulses Pw for writing in.

The audio signal b1 which is temporarily recorded in the memory 75 is taken out with the timing pulse Pr for reading-out when the audio signal b2 of the next recorded field (or the second field in FIG. 18) is being recorded on a track of a magnetic disk, converted by a D/A converter 76, frequency-modulated by a modulator 59, finally taken out through a band filter 65 and then recorded in multiplex with the audio signals b2 of the next recorded field by a magnetic head 69.

The audio signal b1 of the skipped field which is thus taken out from the memory 75 through the band filter 65 is mixed with the audio signals b2 of the next recorded field which has passed through a low band filter 66, multiplexed by frequency modulation, mixed with a modulated video signal a2, passed through an amplifier 68 and recorded on a track of a magnetic disk by a head 69. The audio signals b1, b2 are recorded on the same track in the state shown in FIGS. 18 (b) and (c).

These audio signals may be recorded by inserting in a low band zone E (100–200 KHz) of chromaticity signals, a frequency band zone F (several hundreds KHz) between the chromaticity signals and luminance signals or a high band zone G (several MHz) of the luminance signal. The recording system for the video signals may be the PM modulation system mentioned above or the tilted azimuth recording system by FM modulation. Alternatively, any recording system may be used so far as it is an improved system free of crosstalk even when signals are recorded in high density without guard bands.

Explanation will now be given to the audio signal reproducing system which reproduces audio signals recorded in multiplex on tracks of a magnetic disk.

In reproducing audio signals, as the influence of crosstalk of adjacent tracks can be disregarded in this system as described above, reproduction can be performed with a magnetic head having a scanning width larger than the width of a track as shown in FIG. 16. The width of scanning of the head 57 is the one overriding adjacent tracks (or the width of three tracks) in this embodiment. When reproducing, the same track is scanned with this head 57 repeatedly for a number of times equivalent to the number of skipped fields. In this embodiment, as the number of skipped fields is one, the track is scanned twice or for one additional time. This repeated scanning of the same track produces video signals for two fields. An embodiment of audio reproducing circuits is shown in the schematic block diagram in FIG. 25 wherein the audio signals b1 of the skipped field and the audio signals b2 of the recorded field are separately taken out as signals, are passed from the magnetic head 57 to a demodulator 70 and passed through band filters 72, 73 having different frequencies by means of the switching operation of a switch 71. In other words, at the first scanning the audio signals b1 of the skipped field is taken out and at the second scanning the audio signals b2 of the recorded field is taken out. In this manner, the audio signals which are recorded in multiplex on the tracks of a magnetic disk are produced from the state shown in FIG. 18 (c) to the state shown in FIG. 18 (a).

In the embodiment of audio recording and reproducing systems, although explanation is given to the case where the skipped space is one field, the number of fields to be skipped is not limited to one. Similarly, although the audio signals which have been frequency-modulated are recorded on a magnetic disk in the above embodiment, they may be modulated by phase modulation.

According to the recording system mentioned above, as the audio signals of the fields to be skipped in the field skip recording of video signals are recorded in a memory temporarily, read out at the next recorded field, and recorded in multiplex with the audio signals of the recorded field on a magnetic disk, an additional track for skipped voice becomes unnecessary, thereby enabling higher density recording. According to the reproducing system mentioned above, as the audio signals which have been recorded in multiplex by the system mentioned above are separated and sequentially taken out by switching operation of band filters, it can reproduce continuous audio signals even if they are recorded intermittently by the field skip recording.

I claim:

1. A recording method for video and audio signals in a magnetic picture recording system having a video head and a magnetic medium, comprising: obtaining FM luminance signals by FM-modulating a main carrier with luminance signals, PM-modulating first and second auxiliary carriers which are synchronized with relative movement between the video head and the magnetic medium and are perpendicular to each other by one of two color signals, phase-shifting the two PM color signals relatively by 180° per one horizontal scanning period so that they are frequency-interleaved with each other for multiplexing the two PM color signals at the time of recording, recording said FM luminance signals and the two PM color signals in multiplex on the magnetic medium such that azimuth of a track on the magnetic medium becomes different from that of adjacent tracks, that at least recording positions of horizontal synchronization signals are aligned between adjacent tracks, and that the phases of the first and second auxiliary carriers are aligned between adjacent tracks, allocating audio signal carriers of each track to frequencies which are different from those of adjacent tracks, and modulating the allocated carriers for each audio signal with audio signals so that they are recorded in multiplex together with said FM luminance signals and the two PM color signals which are phase-shifted by 180° relative to each other.

2. A recording method for video and audio signals in a magnetic picture recording system of the type having a video head and a magnetic recording medium, comprising: obtaining FM luminance signals by FM-modulating a main carrier with luminance signals, PM-modulating first and second auxiliary carriers which are synchronized with relative movement between the video head and the magnetic medium and are perpendicular to each other, by one of two color signals, phase-shifting the two PM color signals relatively by 180° per one horizontal scanning period so that they are frequency interleaved with each other for multiplexing the two PM color signals at the time of recording; recording said FM luminance signals and the two PM color signals in muliplex on the magnetic medium such that azimuth of a track on the magnetic medium becomes different from that of adjacent tracks, that at least recording positions of horizontal synchronization signals are aligned between adajcent tracks, and the phases of the first and second auxiliary carriers are aligned between adjacent tracks, allocating audio signal carriers of each track to frequencies which are different from those of adjacent racks, modulating the allocated carriers for each audio signal with audio signals so that they are recorded in multiplex together with said FM luminance signals and the two PM color signals which are phase shifted by 180° relative to each other, and at the time of reproduction, using said carrier audio signals for tracking.

3. A recording method for video and audio signals in a magnetic picture recording system of the type having a video head and a magnetic medium with tracks, and in which crosstalk is avoided even if the video head overrides adjacent tracks during reproduction, comprising: phase-modulating a main carrier by luminance signals, aligning recording positions of synchronous signals between adjacent tracks, and aligning the phases of the main carrier between adjacent tracks, allocating plural carriers in a number equivalent to, or higher than, the maximum number of tracks on the recording medium which the video head overrides and having different frequencies to tracks periodically, and angle-modulating the allocated carriers with audio signals so as to be recorded in multiplex with said modulated luminance signals.

4. A method of field skip recording video and audio signals in a magnetic picture recording system of the type having a video head and a magnetic disk, recording luminance signals and/or color signals of video signals on adjacent tracks of the magnetic disk without a void space therebetween, using audio carriers having different frequencies of each adjacent track of the magnetic disk, obtaining modulated audio signals by one of frequency-modulating and phase-modulating the carriers with audio signals of each track for recording the same in said adajacent tracks, recording the audio signals of the skipped time separately, and reading out said last-mentioned signals during the next field recording so as to be recorded in multiplex with the audio signals of the recorded field on the magnetic disk.

5. A recording method according to claim 4, wherein the audio signals of the skipped field are temporarily recorded on an auxiliary track on the magnetic disk.

6. A recording method according to claim 4, wherein the audio signals of the skipped field are recorded temporarily in a memory.

7. A recording method of field skip recording video and audio signals in a magnetic picture recording system of the type having a video head a magnetic disk, recording luminance signals and/or color signals of video signals on adjacent tracks of the magnetic disk without a void space therebetween, using audio carriers having different frequencies for each adjacent track of the magnetic disk, obtaining modulated audio signals by one of frequency-modulating and phase-modulating the carriers with audio signals of each track for recording the same in said adjacent tracks, recording the audio signals of the skipped time separately, and reading out the last-mentioned signals during recording the field and then recording the same multiplex with the audio signals of the recorded field, and at the time reproduction, scanning the same track with a reproduction magnetic head repeatedly and additionally for a number of times equivalent to the number of skipped fields, separating the audio signals of each field, and reproducing the audio signals from the multiplexed audio signal output of said reproduction magnetic head by sequential switch operation of band filters which have different frequency bands.

* * * * *